United States Patent
Rao et al.

(10) Patent No.: US 9,815,425 B2
(45) Date of Patent: Nov. 14, 2017

(54) AUTONOMOUS VEHICLE RESTRAINT DEPLOYMENT

(71) Applicant: Ford Global Technologies, LLC, Dearborn, MI (US)

(72) Inventors: Manoharprasad K. Rao, Novi, MI (US); Mark A. Cuddihy, New Boston, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 85 days.

(21) Appl. No.: 15/005,100

(22) Filed: Jan. 25, 2016

(65) Prior Publication Data
US 2017/0210322 A1    Jul. 27, 2017

(51) Int. Cl.
| | |
|---|---|
| B60R 22/00 | (2006.01) |
| E05F 15/00 | (2015.01) |
| G05D 1/00 | (2006.01) |
| B60R 21/015 | (2006.01) |
| B60N 2/14 | (2006.01) |
| B60N 2/01 | (2006.01) |
| B60N 2/02 | (2006.01) |
| G01D 5/14 | (2006.01) |
| G01D 5/36 | (2006.01) |
| B60R 21/00 | (2006.01) |
| B60R 21/01 | (2006.01) |

(52) U.S. Cl.
CPC ......... *B60R 21/01554* (2014.10); *B60N 2/01* (2013.01); *B60N 2/0244* (2013.01); *B60N 2/0276* (2013.01); *B60N 2/14* (2013.01); *G01D 5/142* (2013.01); *G01D 5/36* (2013.01); *B60N 2002/0272* (2013.01); *B60R 2021/0032* (2013.01); *B60R 2021/01034* (2013.01)

(58) Field of Classification Search
None
See application file for complete search history.

(56) References Cited

U.S. PATENT DOCUMENTS

| | | |
|---|---|---|
| 4,574,410 A | 3/1986 | Lassmann et al. |
| 4,802,706 A | 2/1989 | Onimaru et al. |
| 5,178,025 A | 1/1993 | Bennett et al. |

(Continued)

FOREIGN PATENT DOCUMENTS

CN    205363227 U    7/2016

OTHER PUBLICATIONS

Wang et al., "360 Degree Angle Sensor Using Spin Valve Materials with SAF Structure", NVE Corp., Eden Prairie, MN, USA, IEEE Transactions on Magnetics (Impact Factor: 1.39); Nov. 2005; 41(10):3700-3702. DOI: 10.1109/TMAG.2005.854806 (3 pages).

(Continued)

*Primary Examiner* — Bhavesh V Amin
(74) *Attorney, Agent, or Firm* — Frank A. MacKenzie; Bejin Bieneman PLC (57) ABSTRACT

A vehicle system includes a base, a driver seat rotatably disposed on the base, a sensor, and a processor. The sensor is programmed to measure an angular displacement of the driver seat relative to the base and output a displacement signal representing the angular displacement. The processor is programmed to receive the displacement signal and select at least one of a plurality of passive safety devices based at least in part on the angular displacement represented by the displacement signal and only deploy the selected passive safety devices during a collision.

18 Claims, 9 Drawing Sheets

(56) References Cited

U.S. PATENT DOCUMENTS

| | | |
|---|---|---|
| 5,249,826 A | 10/1993 | Bell |
| 5,328,234 A | 7/1994 | Daniel et al. |
| 5,670,853 A | 9/1997 | Bauer |
| 5,787,377 A | 7/1998 | Watanabe et al. |
| 5,802,706 A | 9/1998 | Barrett |
| 6,125,313 A | 9/2000 | Watanabe et al. |
| 6,134,492 A | 10/2000 | Breed et al. |
| 6,168,234 B1 | 1/2001 | Haynes et al. |
| 6,425,490 B1 | 7/2002 | Ta |
| 6,561,544 B1 | 5/2003 | Clancy et al. |
| 6,851,655 B2 | 2/2005 | Kume et al. |
| 6,991,060 B2 | 1/2006 | Chernoff et al. |
| 7,934,763 B2 | 5/2011 | Mabuchi et al. |
| 8,831,839 B2 | 9/2014 | Cuddihy et al. |
| 9,073,574 B2 | 7/2015 | Cuddihy et al. |
| 9,096,150 B2 | 8/2015 | Cuddihy et al. |
| 9,108,584 B2 | 8/2015 | Rao et al. |
| 2007/0105695 A1 | 5/2007 | Susta |
| 2009/0039691 A1 | 2/2009 | Downey |
| 2011/0024601 A1 | 2/2011 | Shoemaker et al. |
| 2015/0037640 A1 | 2/2015 | Pinon et al. |
| 2015/0137564 A1 | 5/2015 | Cuddihy et al. |
| 2015/0203162 A1 | 7/2015 | Suzuki |
| 2015/0375639 A1 | 12/2015 | Yin et al. |
| 2016/0137258 A1 | 5/2016 | Alvarez-Lcaza et al. |
| 2017/0050539 A1 | 2/2017 | Akimoto |

OTHER PUBLICATIONS

Non-Final Office Action dated May 10, 2017; U.S. Appl. No. 15/005,094, filed Jan. 25, 2016.

Notice of Allowance dated Jun. 23, 2017; U.S. Appl. No. 15/005,095, filed Jan. 25, 2016.

AUTONOMOUS VEHICLE RESTRAINT DEPLOYMENT

CROSS-REFERENCE TO RELATED APPLICATIONS

This application is related to U.S. Ser. No. 15/005,094 filed on Jan. 25, 2016 and titled "Vehicle Seat Position Sensing" and U.S. Ser. No. 15/005,095 filed on Jan. 25, 2016 (now U.S. Pat. No. 9,731,628, issued Aug. 15, 2017) and titled "Autonomous Vehicle Restraint Selection," the contents of which are hereby incorporated by reference in their entireties.

BACKGROUND

Fully and partially autonomous vehicles reduce the workload of the vehicle driver. In some cases, the workload is reduced so much that the driver is free to engage in other activities such as interacting with other occupants, watching videos, reading, etc. Accordingly, the reduced workload may allow the driver to relax while the vehicle operates autonomously.

DETAILED DESCRIPTION

One way to allow the driver to relax and interact with other occupants while the vehicle operates autonomously is to allow some or all of the seats in the vehicle cabin to rotate. For instance, the first row seats may rotate to allow the driver and front row passenger to face one another. Alternatively, the first row seats may rotate to face the back row seats.

Rotating the seats, however, can create issues with the vehicle's passive safety systems. For example, rotating the seats may move an occupant away from one airbag but toward another. Therefore, the airbags and other passive safety systems may be controlled according to the orientation of the seats.

Detecting the orientation of the seats may also provide various challenges, especially if the seats are rotating to more than two positions (i.e., a front-facing position and a rear-facing position). As mentioned above, the front row seats may be rotated 90 degrees toward the center of the cabin to face one another or 180 degrees to face the rear seats. Some implementations may permit the seats to rotate to other angles, including a full 360 degrees of angular displacement. Accordingly, controlling the passive restraint devices may be more involved than simply determining whether a seat is front-facing or rear-facing.

Finally, the direction of impact and the area of the vehicle where an impact occurs categorized as virtual zones may further inform which restraint device to deploy given a particular seat orientation.

An example vehicle system that can detect the seat orientation, up to and including 360 degrees of rotation, includes a base, a seat rotatably disposed on the base, a magnet generating a magnetic field, and a sensor. The sensor is programmed to measure an angular displacement of the seat relative to the base based at least in part on an orientation of the magnetic field generated by the magnet. Alternatively, the sensor may detect the angular displacement using a light emitter and receiver instead of the magnet.

In some possible implementations, the sensor is programmed to output a displacement signal representing the angular displacement and a processor is programmed to receive the displacement signal and select at least one passive safety device for deployment during a collision based at least in part on the angular displacement represented by the displacement signal. Moreover, depending on the angular displacement, the processor may further disable another passive safety device.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
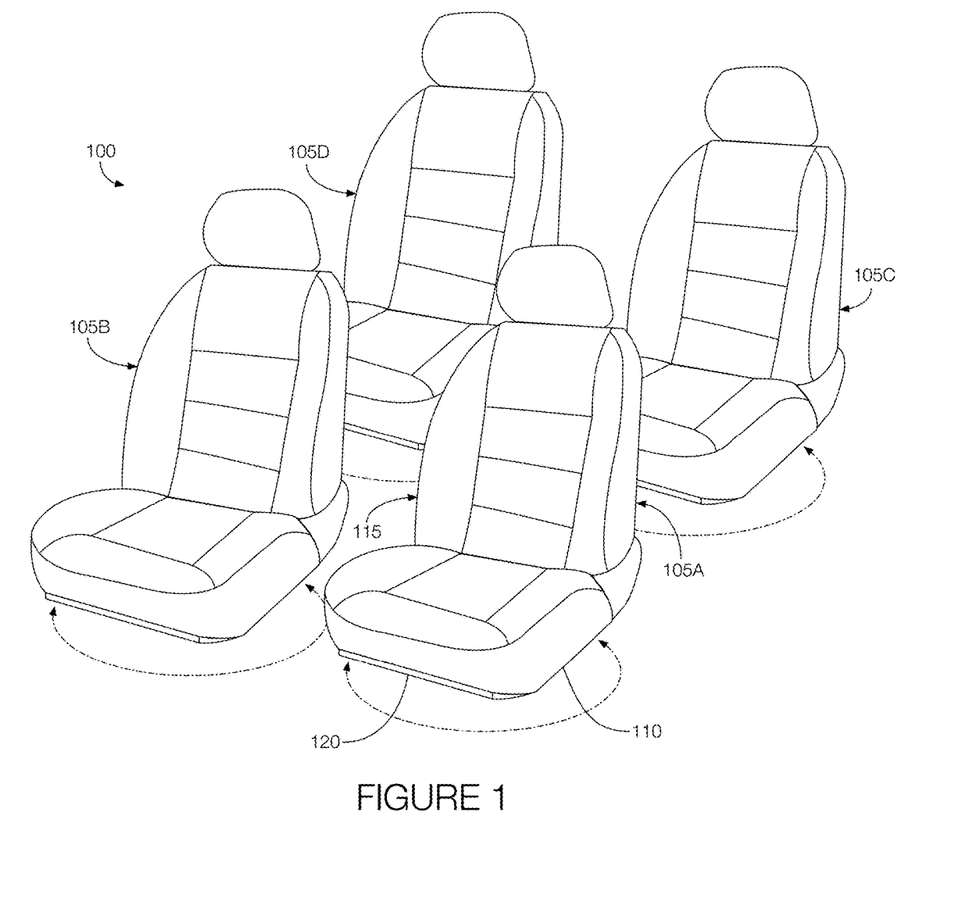
FIG. 1 illustrates an example vehicle interior with rotatable front and rear seats.
Figure 2:
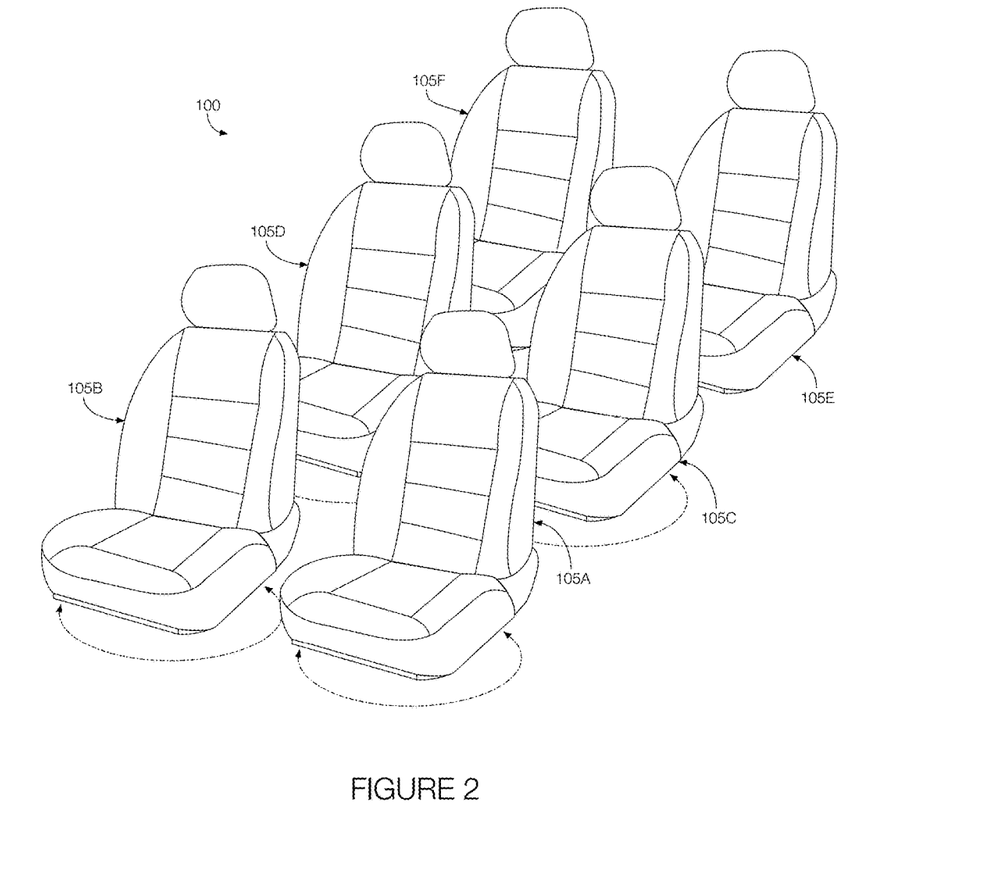
FIG. 2 illustrates an example vehicle interior with rotatable first and second row seats and fixed third row seats.
Figure 3:
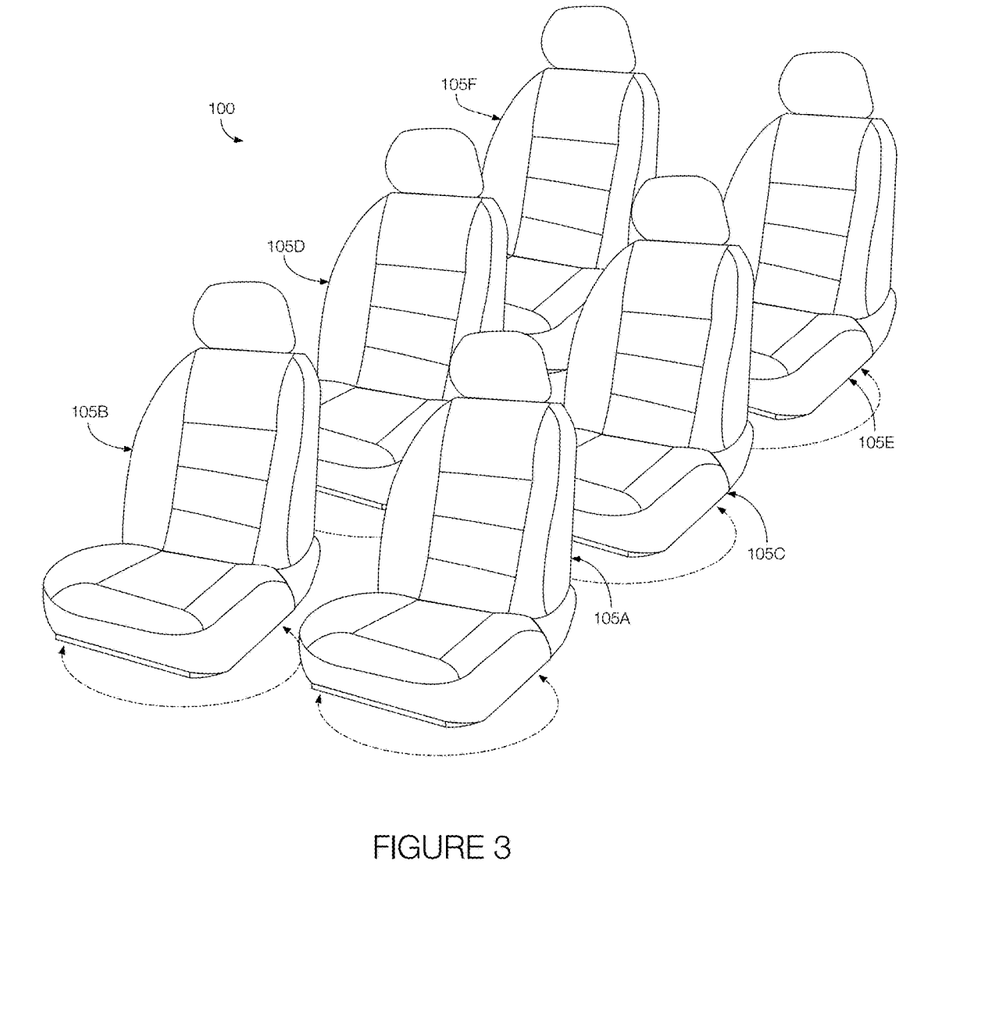
FIG. 3 illustrates an example vehicle interior with rotatable first, second, and third row seats.

FIGS. 1-3 illustrate example vehicle interiors 100 with various rotatable seats 105. As shown in FIG. 1, the front seats 105A-B and rear seats 105C-D are individually rotatable. That is, one or both of the front seats 105A-B may be rotated to face one another or face the rear seats 105C-D. Further, the rear seats 105C-D may be rotated to face one another. FIG. 2 illustrates an example vehicle interior 100 with rotatable first row seats 105A-B, rotatable second row seats 105C-D, and fixed third row seats 105E-F. Therefore, the first row seats 105A-B and second row seats 105C-D may rotate as described above, but the third row seats 105E-F may remain forward facing, as shown. FIG. 3 illustrates an example vehicle interior 100 with rotatable first row seats 105A-B, rotatable second row seats 105C-D, and rotatable third row seats 105E-F.

In the implementations shown in FIGS. 1-3, the rotatable seats 105 may be individually rotated as a singular unit. For example, each seat 105 may include a seat portion 110 and a seat back 115. The seat back 115 may be fixed relative to the seat portion 110 so that the seat back 115 may always remain in the same orientation relative to the seat portion 110, although the seat back 115 may still recline relative to the seat portion 110. The seat 105 may further include a base 120 that may house a rotation mechanism that facilitates the rotation of the seat 105.

Any of the rotatable seats 105 may be rotated to a particular position. The seats 105 may be individually rotated in a clockwise or counterclockwise direction. The difference between a normal position (e.g., all seats 105 facing forward) and the particular position may be referred to as an angular displacement.

The angular displacement may be associated with a magnitude represented in degrees or radians, for example. In one possible approach, the angular displacement may have a magnitude of zero degrees for a seat 105 facing forward, 90 degrees for a seat 105 facing toward a center line of the vehicle interior 100, 180 degrees for a seat 105 facing rearward, 270 degrees for a seat 105 facing away from the center line of the interior 100 of the vehicle, etc. The angular displacement may be represented with any level of granularity. For instance, the angular displacement may be accurate within one degree, within three degrees, within 10 degrees, etc. The granularity of the angular displacement may be based on the structure of the mechanism for rotating the seats 105, as described in greater detail below.

Any non-rotating seats 105, such as the third row seats 105E-F of FIG. 2, may be a different seat type than the rotating seats 105. For instance, the third row seats 105E-F shown in FIG. 2 may be bench seats instead of bucket seats or captain's chairs.

The vehicle interior 100 may be applied to any type of passenger or commercial vehicle such as a car, a truck, a sport utility vehicle, a crossover vehicle, a van, a minivan, a taxi, a bus, etc. In some possible approaches, the vehicle is an autonomous vehicle that can operate in an autonomous (e.g., driverless) mode, a partially autonomous mode, and/or a non-autonomous mode.

Figure 4:
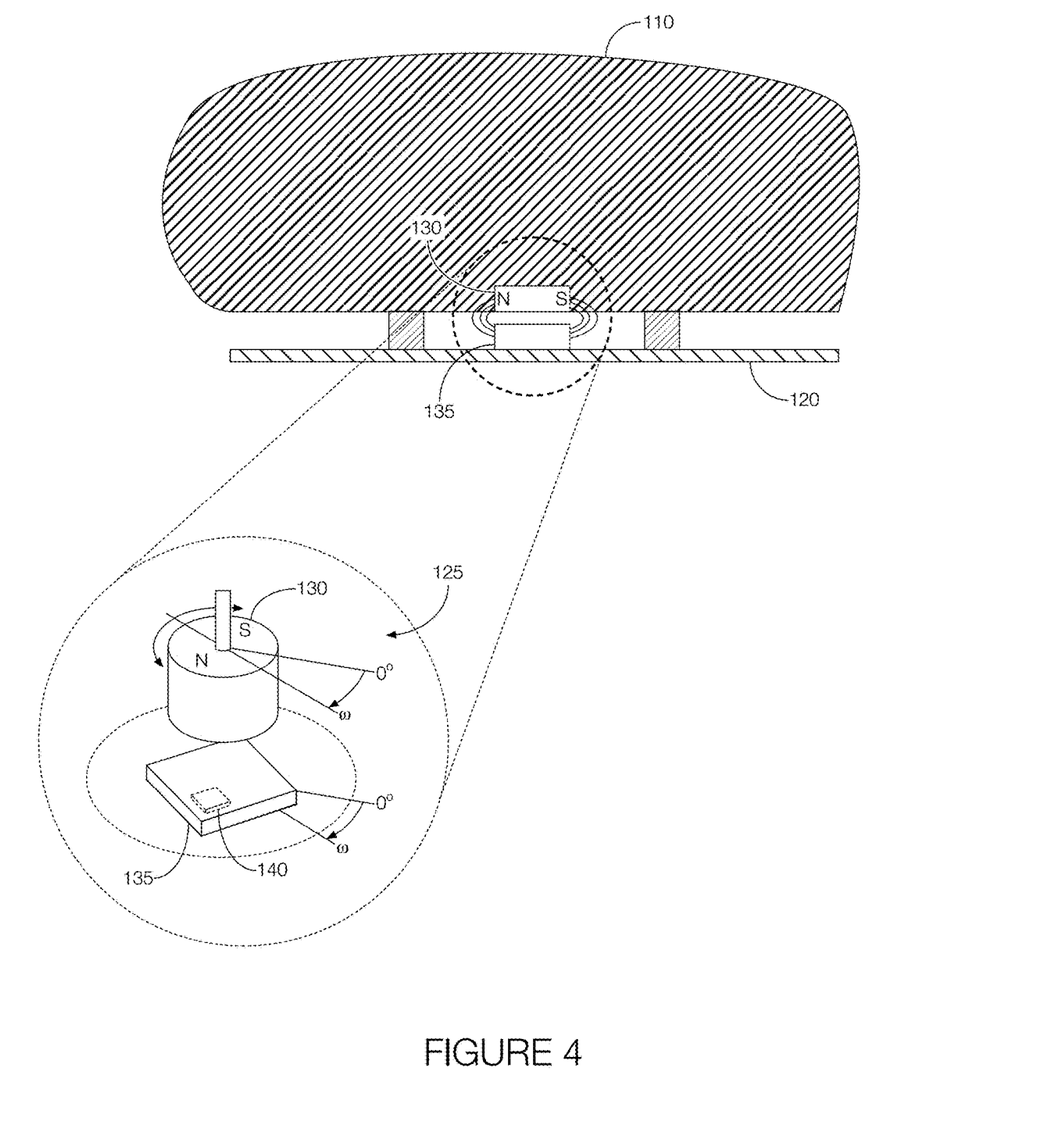
FIG. 4 illustrates components of an example vehicle system for detecting an absolute angular displacement of a rotatable seat using a magneto resistive sensor.

FIG. 4 illustrates components of an example vehicle system 125 for detecting an absolute angular displacement of a rotatable seat 105 using, e.g., a magnet 130 and a magneto resistive sensor 135. The rotatable seat 105 may include a base 120 and a seat portion 110 rotatably disposed on the base 120. The seat portion 110, therefore, may rotate relative to the base 120. In other words, the base 120 may remain stationary while the seat portion 110 is rotated.

The magnet 130 may include a permanent magnet that generates a magnetic field. The magnet 130 may be disposed on the seat portion 110 or the base 120. The sensor 135 may be disposed on the other of the seat portion 110 or base 120 or anywhere else spaced from the magnet 130 and rotatable relative to the magnet 130. In the example shown in FIG. 4, the magnet 130 is disposed on the seat portion 110 and the sensor 135 is disposed on the base 120. Thus, the magnet 130 may rotate with the seat portion 110 while the base 120 and sensor 135 remain stationary. Alternatively, the sensor 135 may be disposed on the seat portion 110 while the magnet 130 is disposed on the base 120.

The sensor 135 may be spaced from the magnet 130 a distance that permits the magnet 130 to rotate relative to the sensor 135 while still allowing the sensor 135 to detect the magnetic field generated by the magnet 130. The sensor 135 may include or be in communication with a processor 140 programmed to measure the angular displacement ω of the seat portion 110 based on the direction of the magnetic field, which is associated to the orientation of the magnet 130 relative to the sensor 135. For instance, different magnet 130 orientations may cause different currents to flow through internal circuits of the sensor 135. Based on the current flow through the sensor 135, the sensor 135 may be programmed to determine the orientation of the magnet 130. Because the magnet 130 is fixed relative to the seat portion 110 (or base 120, as the case may be), the orientation of the magnet 130 may be directly related to the angular displacement ω of the seat 105. The processor 140, therefore, may include any number of electronic components programmed to receive electrical signals generated in accordance with the magnetic field and determine the angular displacement in accordance with the generated signals.

Figure 5A:
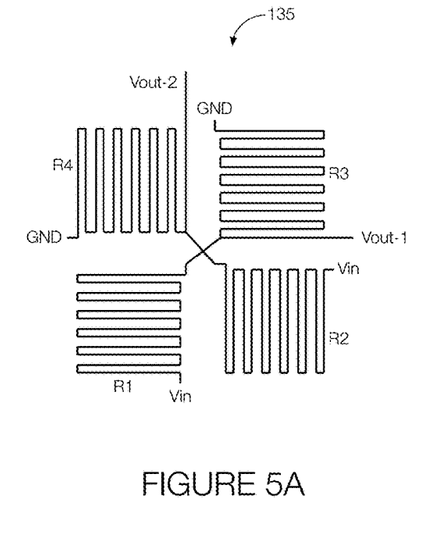
FIGS. 5A-5B illustrate an example schematic and circuit diagram, respectively, of the magneto resistive sensor.
Figure 5B:
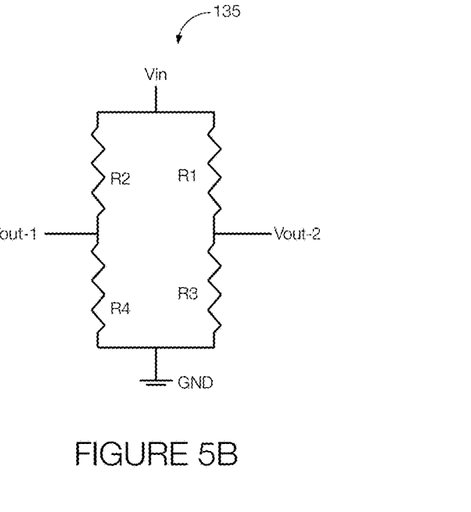

Referring now to FIGS. 5A-5B, where the sensor 135 includes or is implemented via magneto-resistive elements, the sensor 135 may include multiple resistors R1-R4 arranged in a Wheatstone bridge. The Wheatstone bridge may receive an input signal $V_{in}$ and output two displacement signals $V_{out-1}$ and $V_{out-2}$. The displacement signals may be output in accordance with the orientation of the magnetic field. For example, each resistor R1-R4 may be oriented such that the magnetic field may act differently on each one. As shown in FIG. 5A, the resistors may be arranged in half-bridge pairs where one half-bridge includes resistors R1 and R3 while the other includes resistors R2 and R4. The resistors in each half-bridge pair may be arranged in series with one another. The half-bridge pairs may each have a relatively constant total resistance. Further, the resistors may be affected by the direction of the magnetic field. For instance, each of the resistors may be spin valve resistors, and each pair may be arranged to output a sine or cosine function based on the orientation of the magnet 130 relative to the sensor 135. Therefore, the outputs of the displacement signals $V_{out-1}$ and $V_{out-2}$ may represent the direction of the magnetic field, each up to 180 degrees of rotation of the seat 105. Accordingly, the combination of both displacement signals may provide a full 360-degree rotation displacement value of the seat 105 relative to the base 120.

The displacement signals $V_{out-1}$ and $V_{out-2}$ may be processed by the processor 140 (see FIG. 4) incorporated into or in communication with the sensor 135. The processor 140 may determine the angular displacement ω from the displacement signals $V_{out-1}$ and $V_{out-2}$.

Figure 6:
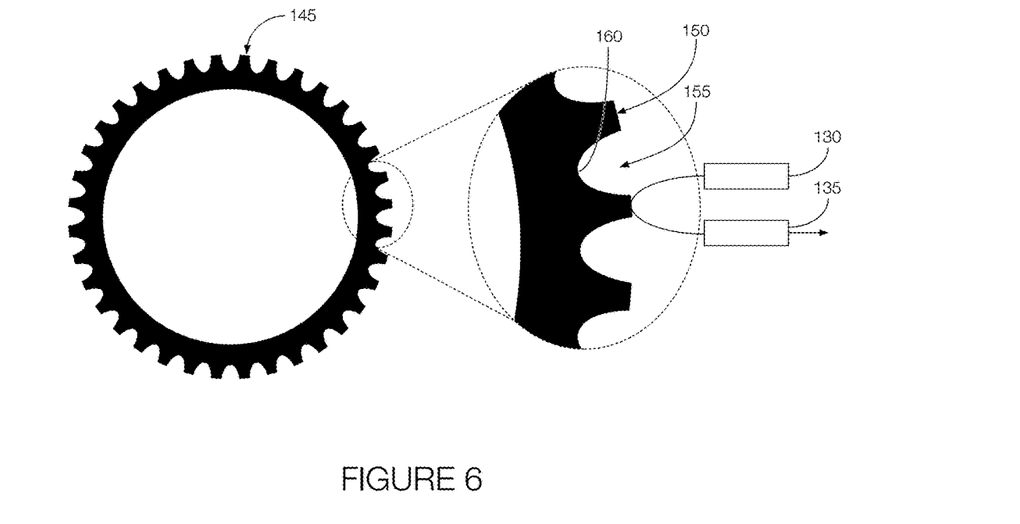
FIG. 6 illustrates an example vehicle system for detecting an absolute angular displacement of a rotatable seat using a Hall effect sensor.

FIG. 6 illustrates an example vehicle system 125 for detecting an absolute angular displacement of a rotatable seat 105 using a magnet 130 and a sensor 135 that includes a Hall effect sensor. In this example approach, the rotation mechanism includes a circle gear 145 disposed on the seat 105 and configured to rotate in accordance with rotation of the seat 105. Alternatively, the circle gear 145 may be disposed on the base 120, making the circle gear 145 stationary relative to the rotation of the seat 105. The magnet 130 and sensor 135 may rotate relative to the circle gear 145, and vice versa. Therefore, if the circle gear 145 is disposed on the seat 105, the magnet 130 and Hall effect sensor 135 may be disposed on the base 120. Alternatively, if the circle gear 145 is disposed on the base 120, the magnet 130 and Hall effect sensor 135 may be disposed on the seat 105. This way, the circle gear 145 may rotate relative to the magnet 130 and sensor 135.

Although spaced from the circle gear 145, the magnet 130 and sensor 135 may be close enough to the circle gear 145 for the sensor 135 to determine how the circle gear 145 interacts with the magnetic field generated by the magnet 130. The circle gear 145, as shown, includes a plurality of teeth 150. Each tooth 150 may be separated from at least one other tooth 150 by a gap 155. The deepest part of the gap 155 (e.g., the part of the gap 155 furthest from the magnet 130, the sensor 135, or both) may be referred to as a "bottomland 160." As the circle gear 145 rotates, different parts of the circle gear 145 act on the magnetic field. Sometimes the gap 155 acts on the magnetic field and other times the tooth 150 acts on the magnetic field. In other words, the teeth 150 may change the strength of the magnetic field, as detected by the sensor 135, as the circle gear 145 rotates. For instance, the magnetic field strength may increase when a tooth 150 passes near the magnet 130 and the magnetic field strength may decrease when the gap 155 passes near the magnet 130. The circle gear 145 may include any number of teeth 150. More teeth 150 may allow for more granularity in detecting the angular displacement of the circle gear 145, and thus, the seat 105. In other words, incorporating more teeth 150 into the circle gear 145 may permit a more accurate determination of the angular displacement.

The sensor 135 may output displacement signals representing the magnetic field strength to, e.g., a processor 140 that is programmed to determine the angular displacement of the circle gear 145, and thus the seat 105, based on the changes in the strength of the magnetic field caused by the rotation of the circle gear 145. The sensor 135 or processor 140 may be programmed to determine whether the circle gear 145 is rotating by monitoring the changes in the strength of the magnetic field. Further, if the sensor 135 or processor 140 knows the starting position of the circle gear 145 (e.g., an angular displacement of zero degrees for a front-facing seat 105), the sensor 135 or processor 140 can determine the angular displacement based on, e.g., the number of teeth 150 in the circle gear 145 and the number of times the strength of the magnetic field has changed, which may represent the number of teeth 150 that passed the magnet 130 and sensor 135 when the circle gear 145 was rotating. Further, the sensor 135 or processor 140 may be programmed to determine the direction of rotation of the circle gear 145 by monitoring the power supplier of the DC motors used to rotate the seats. Seat occupants can control seat rotation direction and position using a DC motor control system. The DC motor moving direction can be reversed by flipping the power supplier between positive and negative voltages, for example, by flipping a switch. Thus through monitoring the power supplier of the DC motor, the seat moving direction can be ascertained in real-time (i.e., sensing a positive voltage may indicate rotation in one direction and sensing a negative voltage may indicate rotation in the other direction).

Figure 7:
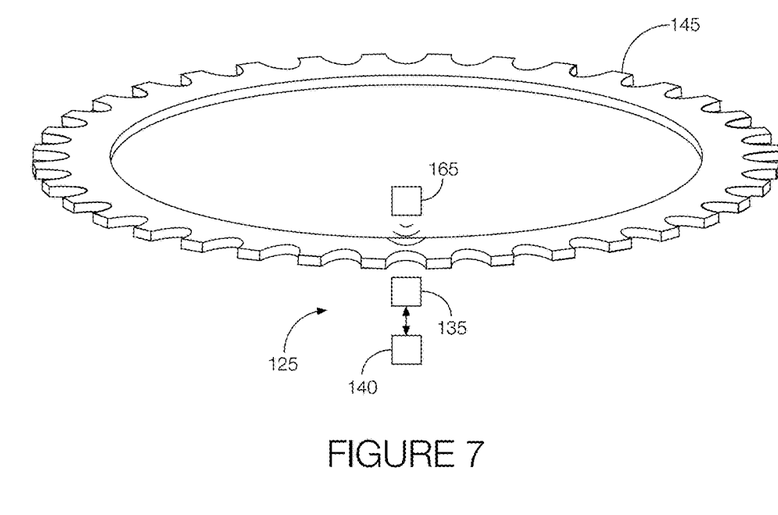
FIG. 7 illustrates an example vehicle system for detecting an absolute angular displacement of a rotatable seat using a light emitter and receiver.

FIG. 7 illustrates an example vehicle system 125 for detecting an absolute angular displacement of a rotatable seat 105 using a light emitter 165 and light-receiving sensor 135 (referred to below as a "receiver 170").

The light emitter 165 may include any device that can transmit light. For instance, the light emitter 165 may include, e.g., a light emitting diode (LED). The light emitter 165 may remain stationary while the circle gear 145 rotates. That is, the light emitter 165 may not rotate with the circle gear 145. The light emitter 165 may be positioned to project light at or between the teeth 150 of the circle gear 145. Thus, the rotation of the circle gear 145 may cause the teeth 150 to periodically block the light emitted by the light emitter 165. The gaps 155 of the circle gear 145, however, may allow light to pass through to the receiver 170.

The receiver 170 may include any device that can receive the light from the light emitter 165 and output a displacement signal in accordance with the light received. For instance, the displacement signal may indicate whether light is presently being received by the receiver 170, the amount of light received (brightness), or the like. The receiver 170 may receive the light emitted from the light emitter 165 when, e.g., the teeth 150 of the circle gear 145 are not blocking the light. During rotation of the circle gear 145, therefore, the receiver 170 may periodically receive the light output by the light emitter 165. The displacement signal may be output to a processor 140.

The processor 140 may process the displacement signal to determine the angular displacement of the circle gear 145. That is, from the displacement signal, the processor 140 may determine the number of times a tooth 150 passed between the light emitter 165 and the receiver 170 since a tooth 150 blocking the light from the light emitter 165 may change the displacement signal output by the receiver 170. The processor 140 may be programmed to determine that certain changes in the displacement signal indicate that a tooth 150 has passed between the light emitter 165 and the receiver 170. The processor 140 may count the number of times the teeth 150 pass between the light emitter 165 and the receiver 170, which may indicate how much the circle gear 145 has rotated. The number of teeth 150 that have passed between the light emitter 165 and receiver 170, therefore, may be used to determine the angular displacement of the circle gear 145, and thus, the seat 105.

Figure 8A:
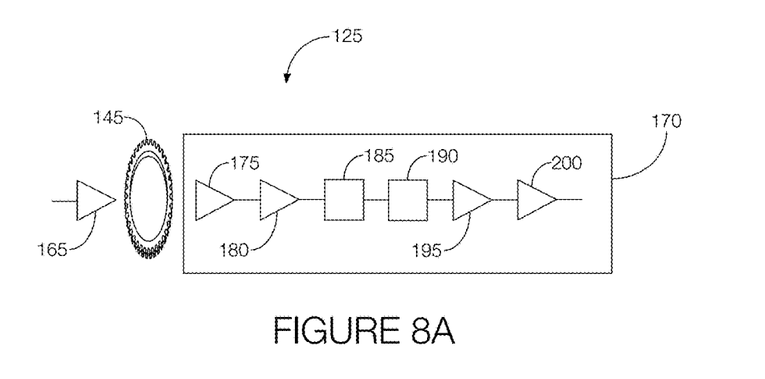
FIGS. 8A-8B illustrate an example schematic and circuit diagram, respectively, for detecting the absolute angular displacement using the light emitter and receiver.
Figure 8B:
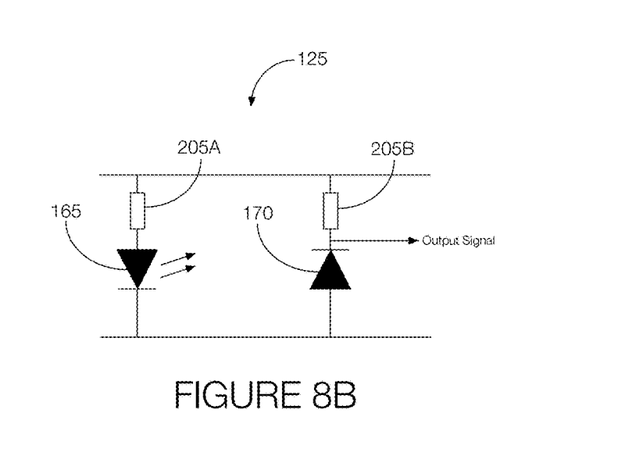

FIGS. 8A-8B illustrate an example schematic and circuit diagram, respectively, of the vehicle system 125 for detecting the absolute angular displacement using the light emitter 165 and receiver 170. Referring to FIG. 8A, the schematic includes the light emitter 165, the circle gear 145, and the receiver 170. As shown, the receiver 170 may include an amplifier 175, a limiter 180, a band pass filter 185, a demodulator 190, an integrator 195, and a comparator 200. The amplifier 175 may include, e.g., one or more transistors that can detect the light generated by the light emitter 165 and output amplified signals representing the light detected. The signals output by the amplifier 175 may be transmitted to the limiter 180. The limiter 180 may include any number of circuit components that let all signals with certain power levels to pass through unaltered while attenuating the power level of signals greater than a predetermined value. The limiter 180 may therefore output altered or unaltered versions of the signal output by the amplifier 175 to the band pass filter 185. The band pass filter 185 may include any number of circuit components that may pass signals within a predetermined frequency range. Thus, if the signal from the limiter 180 is within the predetermined frequency range, the band pass filter 185 may output the signal. If the signal from the limiter 180 is outside the predetermined frequency range, the band pass filter 185 may output nothing. The demodulator 190 may receive the signal output by the band pass filter 185 and extract data from a modulated carrier wave received from the band pass filter 185. The output of the demodulator 190 may be passed to the integrator 195. The integrator 195 may include any number of circuit components that output a time integral of the input. In the example of FIG. 8A, the output of the integrator 195 may be the time integral of the signal output by the demodulator 190. In some instances, the integrator 195 may act as a low pass filter that accumulates a value up to a certain threshold or limit. The output of the integrator 195 may be passed to the comparator 200, which may include any number of circuit components that compares the output of the integrator 195 to a predetermined value. The predetermined value may be associated with an increment indicating whether the circle gear 145 is moving (e.g., whether the amount of light received indicates that a tooth 150 has passed between the light emitter 165 and the receiver 170). The output of the comparator 200, therefore, may represent movement of the circle gear 145 according to any number of increments (i.e., 1 degree, 5 degrees, 10 degrees, 15 degrees, etc.) of movement. The output of the comparator 200 may be the displacement signal passed to the processor 140.

FIG. 8B illustrates an example circuit diagram with the light emitter 165, the receiver 170, and two resistors 205. The light emitter 165 and receiver 170 are shown as diodes. One of the resistors 205A may be connected in series to the light emitter 165 and the other resistor 205B may be connected in series with the receiver 170. The resistors 205, therefore, may stabilize the current through the light emitter 165, the receiver 170, or both. Moreover, the resistors 205 may have the same or different resistance values as one another.

Figure 9:
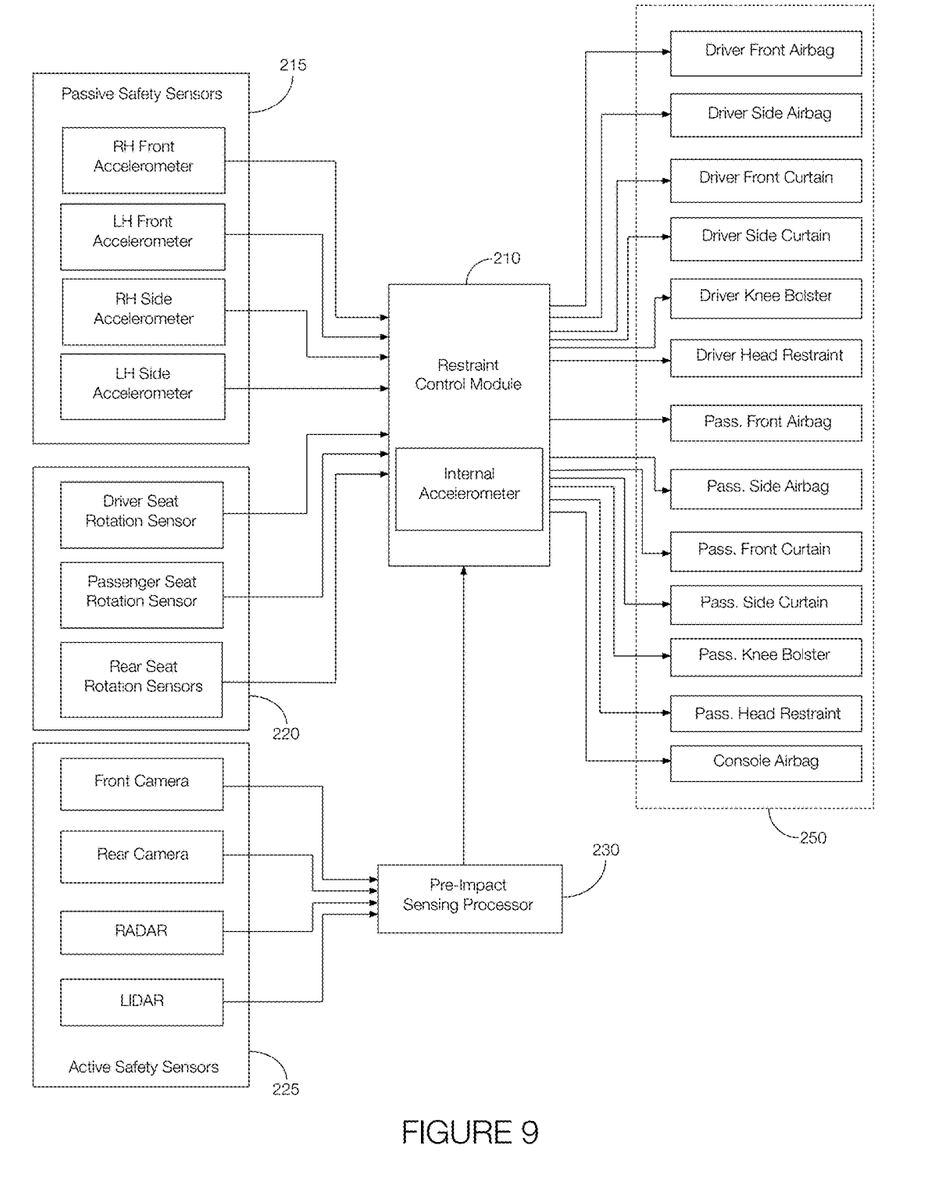
FIG. 9 illustrates an example signal flow diagram for a restraint control module.

FIG. 9 illustrates an example signal flow diagram for a restraint control module 210 that may be incorporated into the vehicle with rotatable seats 105. As shown, the restraint control module 210 may receive signals output by the passive safety sensors 215, various seat position sensors 220, and active safety sensors 225. The passive safety sensors 215 may include driver side (i.e., left-hand (LH)) front accelerometers, passenger side (i.e., right-hand (RH)) front accelerometers, LH side accelerometers, and RH side accelerometers. The seat position sensors 220 may include the sensors discussed above that output signals representing the angular displacement of the seats 105. The active safety sensors 225 may include, e.g., a front camera, a rear camera, a RADAR sensor, a LIDAR sensor, etc. The active safety sensors 225 may output signals to a pre-impact sensing processor 230 that is programmed to make certain decisions about an imminent impact based on the signals output by the active safety sensors 225. The decisions made by the pre-impact sensing processor 230 may include information about potential impact angle, impact object, impact severity, and others.

The passive safety sensors 215 and the seat position sensors 220 may output signals to the restraint control module 210. The signals output by the passive safety sensors 215 may include confirmation of a collision mode, which represents a virtual zone, namely, an area of the vehicle involved in an impact and an impact angle. The virtual zone may also be referred to as an "impact zone." In some possible approaches, the impact angle signal represents the angle, relative to the vehicle, at which a collision occurred. The seat position sensors 220 may output respective angular displacement signals representing the angular displacement of the respective seat 105. The restraint control module 210 may include a processor 140 that receives and processes the collision mode signal, which may represent the virtual zone and impact angle, and the seat angular displacement signals to determine which restraint devices to select for deployment during a collision. That is, the restraint control module 210 may select certain restraint devices based on the angular displacement of one or more seats 105, the impact angle, the virtual zone, etc., and deploy one or more of the selected restraint devices during the collision and, in some instances, after the impact angle and virtual zone have been confirmed.

For example, the restraint control module 210 may receive a seat angular displacement signal indicating that the driver seat 105 is in a rear facing position and that a full frontal impact has occurred. In response, the restraint control module 210 may select some restraint devices such as the driver head restraint for deployment during a collision but disable (i.e., not deploy) others, e.g., the driver front airbag, the driver front curtain, the driver knee bolster, etc., during that same collision. That way, if an impact occurs, appropriate airbags will be deployed based on the orientation of the seats 105 and the collision mode.

Figure 10:
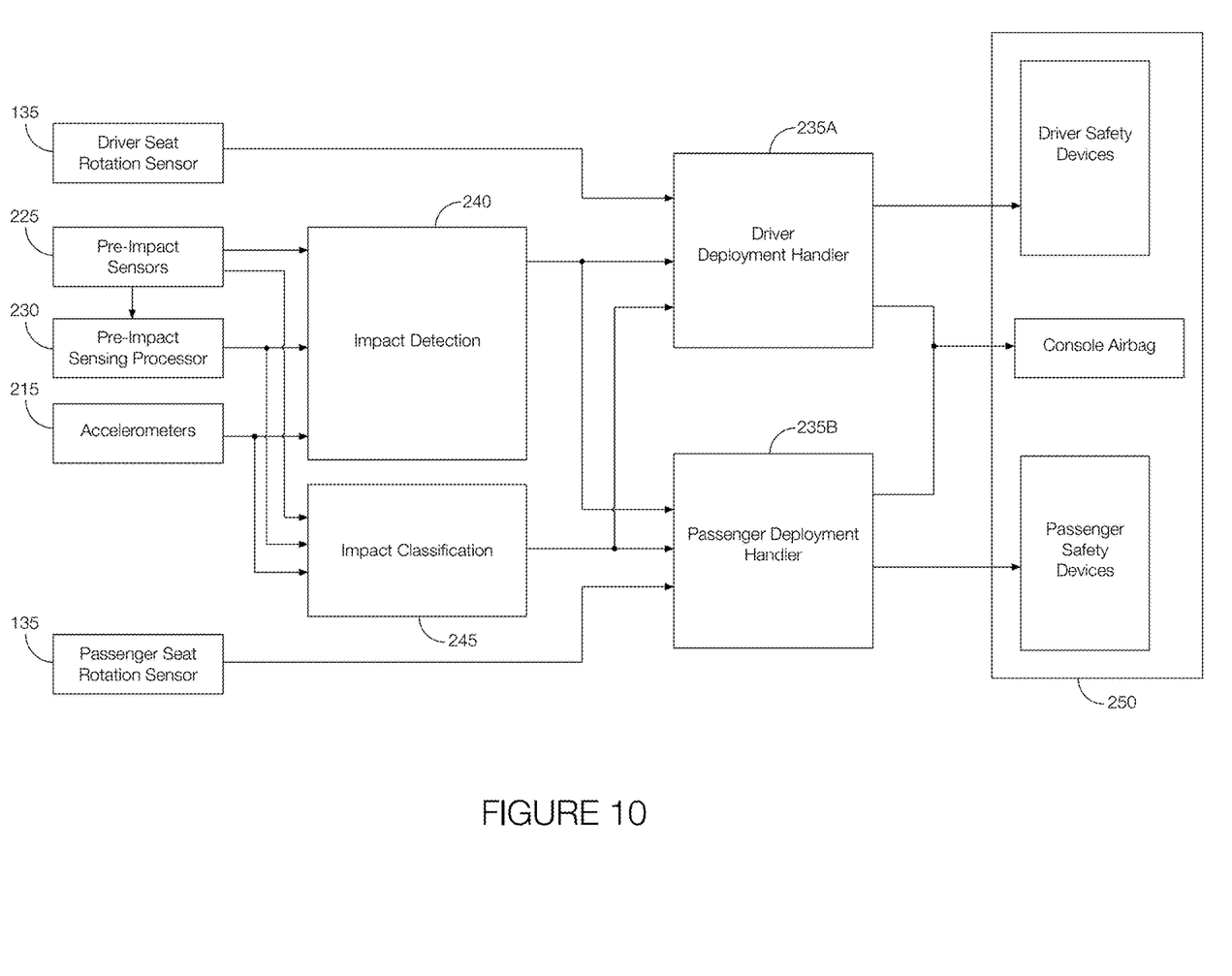
FIG. 10 illustrates an example signal flow diagram for the deployment handlers.
Figure 11:
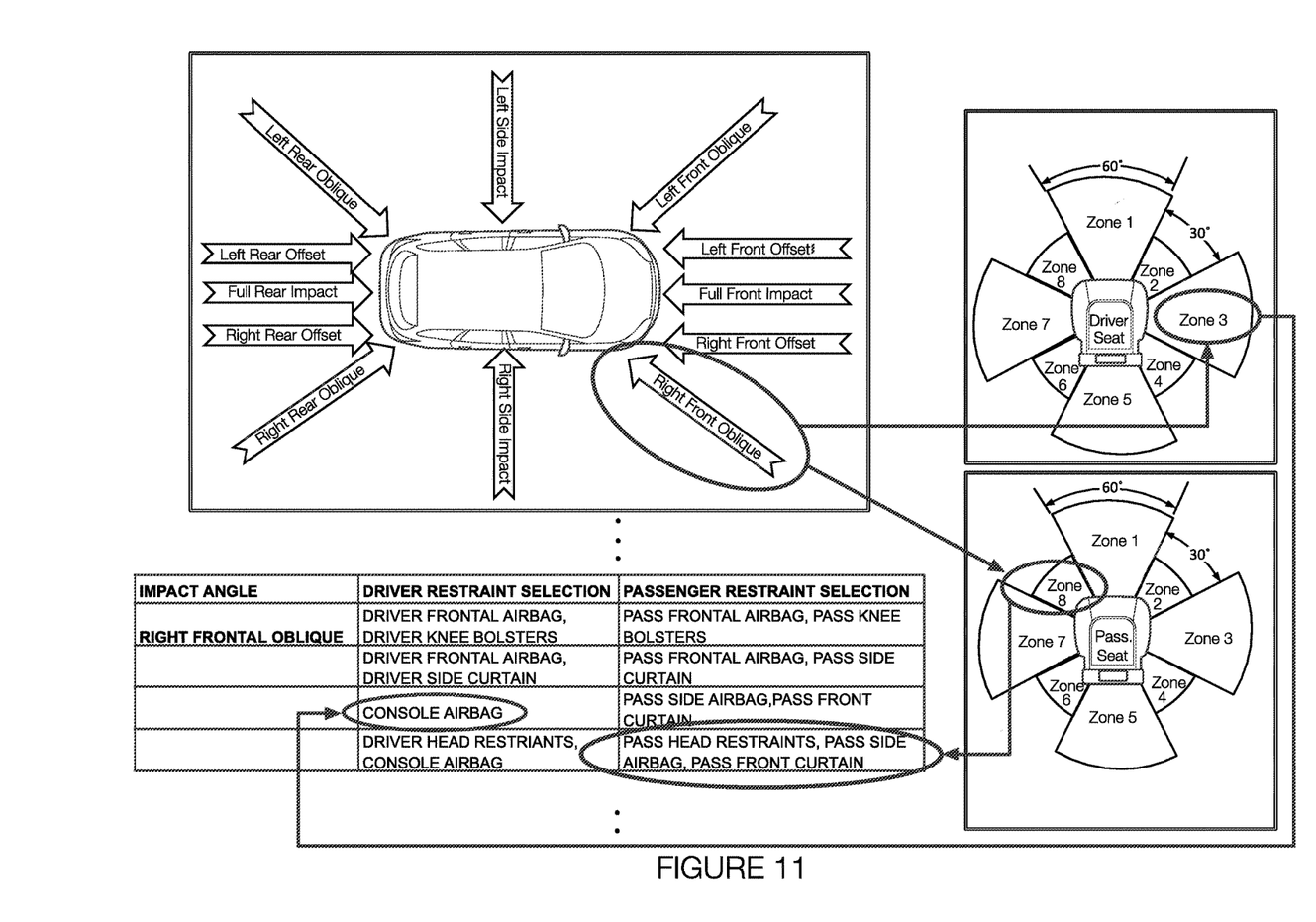
FIG. 11 illustrates an example logic flow for determining which passive restraint devices to select based on the angular displacement of the rotatable seat.

FIG. 10 illustrates an example signal flow diagram for deployment handlers 235. Each rotation sensor 135 may output angular displacement signals to handlers 235 associated with the safety restraint devices 250 associated with each seat 105. Further, the active and passive safety sensors 225, 215 may output signals to an impact detection module 240 and an impact classification module 245. The impact detection module 240 may process the signals output by the active and passive safety sensors 215 to determine a virtual zone associated with the impact. That is, the vehicle may be divided into virtual zones, as shown in FIG. 11, each representing a different area of the vehicle. The impact detection module 240 may detect and confirm an impact and may determine which virtual zones are involved in the impact based on the outputs of the active and passive safety sensors 225, 215. The impact classification module 245 may classify the impact as one of full front impact, left front impact, right front oblique impact, driver side impact, passenger side impact, right rear oblique impact, etc. (as shown in FIG. 11) based on the signals output by the active and passive safety sensors 215.

Both the impact detection module 240 and the impact classification module 245 may output command signals to the respective handlers 235 to select and/or deploy the appropriate restraint devices 250 given the nature of the impact. Further, the handlers 235 may consider the angular displacement signals output by the respective rotation sensors when determining which safety restraint devices 250 to select, deploy, or both. Thus, the selection and deployment of the restraint devices 250 may be based on the virtual zone involved in a collision, the impact angle, the orientation (e.g., angular displacement) of one or more seats 105, or various combinations of these or other factors.

FIG. 11 illustrates an example logic flow for determining which passive restraint devices 250 to select or disable based on the angular displacement of the rotatable seat 105. The seat rotational sensors 135 may provide seat angular displacement to one or more of the deployment handlers 235. As discussed above, the deployment of a restraint device may be based, at least in part, on the virtual zone involved in a collision, the impact angle, and the angular displacement of one or more seats 105. The impact detection module 240 and the impact classification module 245 may determine the virtual zone where an impact has occurred and the impact angle and may output a signal representing the virtual zone and the impact angle (e.g., the collision mode signal) to one or more of the handlers 235. In response, the handlers 235 may query a lookup table for a virtual zone, impact angle, and angular displacement of the seats 105 and query the same or a different lookup table for the selection of appropriate restraint devices 250. With the appropriate restraint devices 250 selected, the deployment handlers 235 may deploy selected restraint devices 250.

In the example shown in FIG. 11, the impact occurs from the right front oblique direction. The impact classification module 240 may output the signal to each handler 235 indicating a right front oblique collision. The handler 235A associated with the driver seat 105 may determine the orientation of the driver seat 105 from the angular displacement signal output by a rotation sensor 135 associated with the driver seat 105A. The handler 235A may query the lookup table for the virtual zone associated with the orientation identified by the angular displacement signal for the selection and deployment of safety restraint devices. In the example of FIG. 11, the handler 235A for the driver seat 105A may determine that one of the appropriate restraint devices 250, based on the angular displacement of the driver seat 105A, the impact angle, and the virtual zone, includes deploying the console airbag. In the example of FIG. 11, the handler 235B for the passenger seat 105B may determine the orientation of the passenger seat 105B based on the angular displacement signal output by the rotation sensor 135 associated with the passenger seat 105B. In this example, the handler 235B may deploy the passenger head restraints, the passenger side airbag, and the passenger front curtain airbag based on the angular displacement of the passenger seat 105B, the impact angle, and the virtual zone associated with that seat. Those restraint devices 250 may be deployed upon detection of the impact.

In this way, only those restraint devices 250 that are associated with impact area, the angle of impact, and seat rotational displacement may be deployed following the impact. By doing so, the handler 235 may avoid deploying a restraint device that will serve no purpose or otherwise be of little value during a collision.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a base;
a driver seat rotatably disposed on the base;
a sensor programmed to measure an angular displacement of the driver seat relative to the base and output a displacement signal representing the angular displacement; and
a processor programmed to receive the displacement signal and select at least one of a plurality of passive safety devices based at least in part on the angular displacement represented by the displacement signal, an impact zone, and a predicted impact angle and only deploy the selected passive safety devices during a collision.

2. The vehicle system of claim 1, wherein the processor is programmed to receive an impact angle signal confirming the predicted impact angle and the impact zone and deploy the at least one passive safety device selected in accordance with the displacement signal and the predicted impact angle and the impact zone.

3. The vehicle system of claim 2, wherein the impact angle signal confirms an area of a host vehicle involved in the collision.

4. The vehicle system of claim 1, wherein the processor is programmed to associate the angular displacement represented by the displacement signal to a virtual zone.

5. The vehicle system of claim 4, wherein the processor is programmed to select at least one of the plurality of passive safety devices based at least in part on the virtual zone associated with the angular displacement represented by the displacement signal.

6. The vehicle system of claim 5, wherein enabling at least one passive safety device based at least in part on the virtual zone includes querying a lookup table for the virtual zone.

7. A vehicle system comprising:
a base;
a driver seat rotatably disposed on the base;
a sensor programmed to measure an angular displacement of the driver seat relative to the base and output a displacement signal representing the angular displacement; and
a processor programmed to receive the displacement signal and select at least one of a plurality of passive safety devices based at least in part on the angular displacement represented by the displacement signal and an impact zone and predicted impact angle, wherein the processor is programmed to receive an impact angle signal confirming an area of a host vehicle involved in a collision and deploy only the at least one selected passive safety device in accordance with the displacement signal, the impact zone, and the impact angle signal.

8. The vehicle system of claim 7, wherein the processor is programmed to associate the angular displacement represented by the displacement signal to a virtual zone.

9. The vehicle system of claim 8, wherein the virtual zone is associated with the at least one selected passive safety device.

10. The vehicle system of claim 8, wherein the processor is programmed to select at least one of the plurality of passive safety devices based at least in part on the virtual zone associated with the angular displacement represented by the displacement signal.

11. The vehicle system of claim 10, wherein selecting the at least one passive safety device based at least in part on the virtual zone includes querying a lookup table for the virtual zone.

12. The vehicle system of claim 11, wherein deploying the at least one selected passive safety device includes querying the lookup table for the virtual zone and for the area of the host vehicle involved in the collision and the impact angle signal.

13. The vehicle system of claim 11, wherein the at least one selected passive safety device is deployed in response to receiving the impact angle signal confirming the collision in the impact zone.

14. A vehicle system comprising:
a base;
a driver seat rotatably disposed on the base;
a sensor programmed to measure an angular displacement of the driver seat relative to the base and output a displacement signal representing the angular displacement; and
a processor programmed to receive the displacement signal, associate the angular displacement represented by the displacement signal to one of a plurality of virtual zones, identify at least one of a plurality of passive safety devices associated with the virtual zone associated with the angular displacement, and select the at least one of the plurality of passive safety devices associated with the virtual zone and based at least in part on an impact zone and predicted impact angle.

15. The vehicle system of claim 14, wherein the processor is programmed to receive an impact angle signal confirming the predicted impact angle and impact zone and deploy the at least one selected passive safety device associated with the virtual zone in response to receiving the impact angle signal.

16. The vehicle system of claim 15, wherein the impact angle signal confirms an area of a host vehicle involved in a collision.

17. The vehicle system of claim 14, wherein the processor is programmed to associate the angular displacement represented by the displacement signal and the virtual zone to at least one of the plurality of passive safety devices by querying a lookup table.

18. The vehicle system of claim 14, wherein the processor is programmed to identify the at least one passive safety device associated with the virtual zone by querying a lookup table.

* * * * *